(12) United States Patent
Watanabe

(10) Patent No.: US 10,187,732 B2
(45) Date of Patent: Jan. 22, 2019

(54) ELECTRONIC APPARATUS

(71) Applicant: KYOCERA CORPORATION, Kyoto (JP)

(72) Inventor: Takaaki Watanabe, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 106 days.

(21) Appl. No.: 14/787,181

(22) PCT Filed: Apr. 22, 2014

(86) PCT No.: PCT/JP2014/002264
§ 371 (c)(1),
(2) Date: Oct. 26, 2015

(87) PCT Pub. No.: WO2014/174835
PCT Pub. Date: Oct. 30, 2014

(65) Prior Publication Data
US 2016/0088399 A1 Mar. 24, 2016

(30) Foreign Application Priority Data

Apr. 26, 2013 (JP) .................................. 2013-093784

(51) Int. Cl.
*H04R 1/02* (2006.01)
*H04R 17/00* (2006.01)
(Continued)

(52) U.S. Cl.
CPC .............. *H04R 17/00* (2013.01); *H04M 1/03* (2013.01); *H04R 1/028* (2013.01); *H04R 1/10* (2013.01);
(Continued)

(58) Field of Classification Search
CPC . H04R 17/02; H04R 2217/00–2217/03; H04R 1/02; H04R 1/025; H04R 1/026
(Continued)

(56) References Cited

U.S. PATENT DOCUMENTS 5,115,162 A * 5/1992 Leonard .................. B60T 7/042
303/DIG. 3
7,702,320 B2 * 4/2010 Komura .............. H04M 1/0202
381/190
(Continued)

FOREIGN PATENT DOCUMENTS

JP 2002-232542 A 8/2002
JP 2005-348193 A 12/2005
WO 2013/046909 A1 4/2013

OTHER PUBLICATIONS

International Search Report, PCT/JP2014/002264, dated Aug. 5, 2014.
(Continued)

*Primary Examiner* — Suhan Ni
(74) *Attorney, Agent, or Firm* — Studebaker & Brackett PC

(57) ABSTRACT

An electronic apparatus for generating a vibration sound by causing a piezoelectric element to vibrate a member having the piezoelectric element attached thereto in an excellent manner is provided. In particular, an electronic apparatus 1 according to the disclosure herein including a piezoelectric element 30 and a panel 10 having the piezoelectric element attached thereto, the electronic apparatus for causing the piezoelectric element 30 to deform the panel 10 in such a manner vibrating a part of a human body in contact with the panel 10 being deformed, and thereby delivering sound, wherein the panel 10 has a recess 10a formed thereon, and the piezoelectric element 30 is attached to the recess 10a.

14 Claims, 8 Drawing Sheets

(51) Int. Cl.
*H04M 1/03* (2006.01)
*H04R 1/10* (2006.01)

(52) U.S. Cl.
CPC ........ *H04R 1/1091* (2013.01); *H04R 2460/13* (2013.01); *H04R 2499/11* (2013.01)

(58) Field of Classification Search
USPC ................................ 381/173, 190, 333, 388
See application file for complete search history.

(56) References Cited

U.S. PATENT DOCUMENTS

| | | | |
|---|---|---|---|
| 8,680,746 B2 * | 3/2014 | Takahashi | B06B 1/0603 310/324 |
| 9,070,864 B2 | 6/2015 | Hayashi et al. | |
| 9,407,984 B2 * | 8/2016 | Tong | H04R 1/2811 |
| 2004/0203503 A1 * | 10/2004 | Rollins | G04B 25/04 455/90.3 |
| 2011/0053653 A1 * | 3/2011 | Tho | H04M 1/0202 455/566 |
| 2012/0289162 A1 * | 11/2012 | Hosoi | H04R 25/606 455/41.3 |
| 2013/0259274 A1 | 10/2013 | Hayashi et al. | |

OTHER PUBLICATIONS

Written Opinion of the International Searching Authority with Concise Explanation, PCT/JP2014/002264, dated Aug. 5, 2014.

* cited by examiner

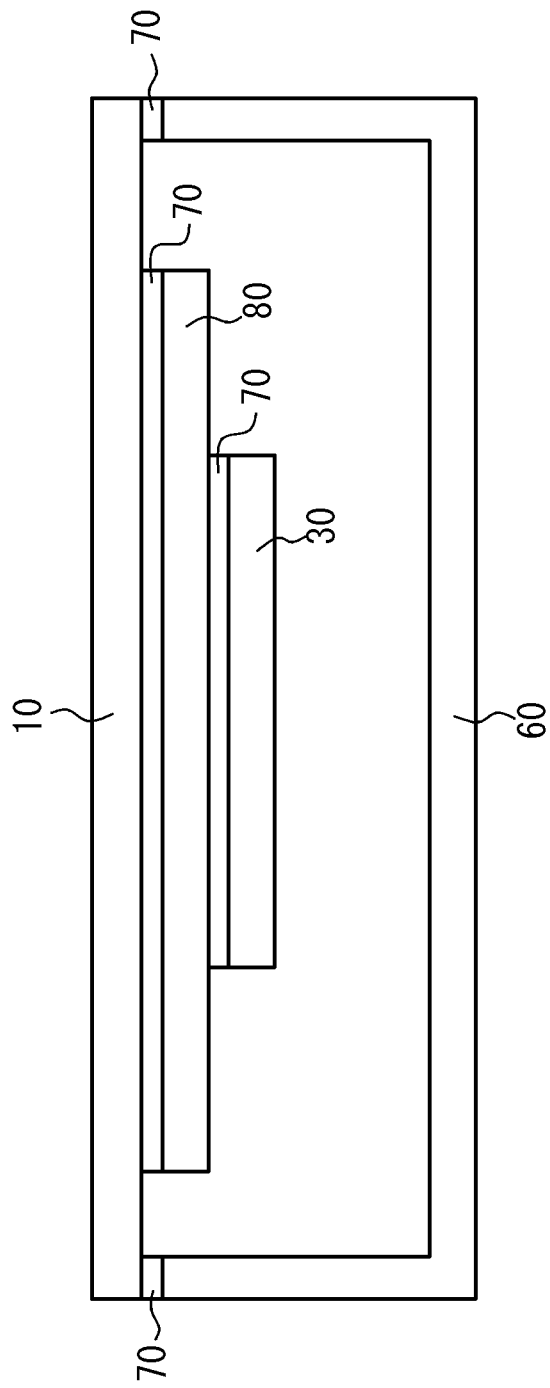

ELECTRONIC APPARATUS

CROSS REFERENCE TO RELATED APPLICATION

This application claims priority to and the benefit of Japanese Patent Application No. 2013-093784 (filed on Apr. 26, 2013, the entire contents of which are incorporated herein by reference.

TECHNICAL FIELD

This disclosure relates to an electronic apparatus for vibrating a member having a piezoelectric element attached thereto by applying a predetermined electrical signal (a sound signal) to the piezoelectric element and, by delivering the vibration of the member to a human body, delivering a vibration sound, which is delivered via a part of the human body, to a user.

BACKGROUND

PLT 1 set forth below describes an electronic apparatus such as a mobile phone that delivers an air conduction sound and a bone conduction sound to a user. The PLT1 also describes that the air conduction sound is a sound that is delivered to the auditory nerve of the user when vibration of the air caused by vibration of an object reaches the eardrum through the ear canal and vibrates the eardrum. The PLT 1 further describes that a vibration sound is a sound that is delivered to the auditory nerve of the user via a part of a user's body (for example, the cartilage of the ear) in contact with the object being vibrating.

In the phone described in the PLT 1, a vibrator in the form of a short rectangular plate constituted by using a piezoelectric bimorph and a flexible material is attached to an outer surface of a housing via an elastic member. The PLT 1 also describes that, upon application of a voltage to the piezoelectric bimorph of the vibrator, a piezoelectric material stretches and contracts in a longitudinal direction causing the vibrator to vibrate in a bending manner and, when the user brings the vibrator into contact with the auricle, the air conduction sound and the vibration sound are delivered to the user.

CITATION LIST

Patent Literature

PLT 1: JP-A-2005-348193

SUMMARY

Technical Problem

It could be helpful to provide an electronic apparatus for generating the vibration sound by causing the piezoelectric element to vibrate the member having the piezoelectric element attached thereto in an excellent manner.

Solution to Problem

An electronic apparatus according to the disclosure herein having a piezoelectric element and a member having the piezoelectric element attached thereto, the electronic apparatus for causing the piezoelectric element to deform the member in such a manner vibrating a part of a human body in contact with the member being deformed, and thereby delivering sound, wherein
the member has a recess formed thereon, and the piezoelectric element is attached to the recess of the member.

Advantageous Effect

According to the disclosure herein, the electronic apparatus for generating the vibration sound by causing the piezoelectric element to vibrate the member having the piezoelectric element attached thereto in an excellent manner may be provided.

BRIEF DESCRIPTION OF THE DRAWINGS

In the accompanying drawings:
FIG. 8 is a diagram illustrating an example of attachment of the panel and a housing.

DETAILED DESCRIPTION

Figure 1:
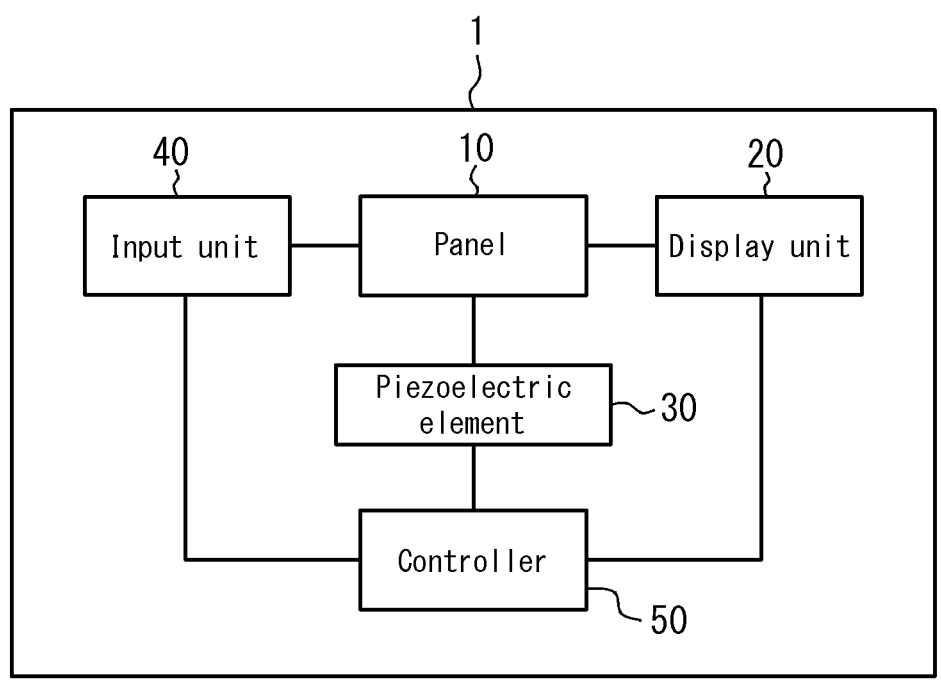
FIG. 1 is a diagram illustrating a functional block of an electronic apparatus according to one embodiment of the disclosure.

Hereinafter, embodiments of the disclosure will be described in detail with reference to the accompanying drawings. FIG. 1 is a diagram illustrating a functional block of an electronic apparatus 1 according to one embodiment of the disclosure. The electronic apparatus 1 is, for example, a mobile phone (a smart phone) and includes a panel 10, a display unit 20, a piezoelectric element 30, an input unit 40, and a controller 50.

The panel 10 is a touch panel for detecting a contact, or a cover panel or the like for protecting the display unit 20. The panel 10 is made of, for example, glass or synthetic resin such as acrylic and the like. The panel 10 preferably has a plate-like shape. The panel 10 may be a flat plate or a curved panel with a gently sloped surface. When the panel 10 is the touch panel, the panel 10 detects a contact by a user's finger, a pen, a stylus pen, and the like. A detection method of the touch panel may be any one of an electrostatic capacitance method, a resistance film method, a surface acoustic wave method (or an ultrasound method), an infrared method, an electromagnetic induction method, a load detection method, and the like. The panel 10 is an example of a member (an attachment member) to which the piezoelectric element 30 is attached.

The display unit 20 is a display device such as a liquid crystal display, an organic EL display, an inorganic EL display, or the like. The display unit 20 is disposed on a rear side of the panel 10. The display unit 20 is disposed on the rear side of the panel 10 by using, for example, a joint member (for example, an adhesive). The display unit 20 may be attached to the panel 10 by the joint member (for example, the adhesive), or disposed being spaced apart from the panel 10 and supported by a housing of the electronic apparatus 1.

The piezoelectric element 30 is an element that, upon application of an electrical signal (a voltage) thereto, stretches and contracts, or curves (bends), in accordance with an electromechanical coupling coefficient of a constituent material. The piezoelectric element 30 may be made of, for example, ceramic or crystal. The piezoelectric element 30 may be a unimorph, a bimorph, or a laminated piezoelectric element. The laminated piezoelectric element includes a laminated unimorph element including laminated unimorphs (for example, 16 to 24 layers thereof), or a laminated bimorph element including laminated bimorphs (for example, 16 to 24 layers thereof). The laminated piezoelectric element has a multilayer structure including a plurality of dielectric layers made of, for example, PZT (lead zirconate titanate) and electrode layers disposed therebetween. The unimorph stretches and contracts upon application of the electrical signal (voltage), and the bimorph bends upon application of the electrical signal (voltage).

The piezoelectric element 30 is disposed, for example, on a rear surface of the panel 10 (an internal surface of the electronic apparatus 1). The piezoelectric element 30 is attached to the panel 10 by the joint member (for example, a double-sided adhesive tape). The piezoelectric element 30 may be attached to the panel 10 via an intermediate member (for example, sheet metal). The piezoelectric element 30 is disposed on the rear surface of the panel 10 and spaced apart from an internal surface of a housing 60 by a predetermined distance. The piezoelectric element 30 is preferably spaced apart from the internal surface of the housing 60 by the predetermined distance also when stretching and contracting, or bending. That is, a distance between the piezoelectric element 30 and the internal surface of the housing 60 is preferably greater than a maximum deformation amount of the piezoelectric element 30.

The input unit 40 receives an input operation from a user and is constituted by using, for example, an operation button (an operation key). When the panel 10 serves as the touch panel, the panel 10 may also receive the input operation from the user by detecting the contact by the user.

The controller 50 is a processor for controlling the electronic apparatus 1. The controller 50 applies a predetermined electrical signal (a voltage corresponding to a sound signal) to the piezoelectric element 30. The voltage applied to the piezoelectric element 30 by the controller 50 may be, for example, ±15 V, which is greater than a voltage ±5 V applied by what is called a panel speaker used for the purpose of delivering sound by an air conduction sound rather than by a human body vibration sound. Thereby, when the user presses the panel 10 against a user's body applying force of, for example, 3 N or greater (force of 5 N to 10 N), the panel 10 may generate sufficient vibration allowing generation of the human body vibration sound via a part of the user's body. Note that a level of the voltage to apply is appropriately adjustable based on fixing strength of the panel 10 to the housing or a support member, or based on performance of the piezoelectric element 30. When the controller 50 applies the electrical signal to the piezoelectric element 30, the piezoelectric element 30 stretches and contracts, or bends, in a longitudinal direction. At this time, the panel 10 having the piezoelectric element 30 attached thereto is deformed following the stretch and contraction, or bend, of the piezoelectric element 30 and vibrates. The panel 10 is curved due to the stretch and contraction, or the bend, of the piezoelectric element 30. The panel 10 is bent directly by the piezoelectric element 30. Note that "the panel 10 is bent directly by the piezoelectric element 30" is different from a phenomenon that, as employed by a conventional panel speaker, inertial force of a piezoelectric actuator composed of a piezoelectric element disposed inside a casing excites a specific region of a panel and deforms the panel. "The panel 10 is bent directly by the piezoelectric element 30" means that the stretch and contraction, or the bend (curve), of the piezoelectric element 30 directly bends the panel via the joint member, or via the joint member and a reinforcing member 80 described below. Thereby, the panel 10 generates the air conduction sound and also, when the user brings the panel 10 into contact with a part of the user's body (for example, the cartilage of the external ear), generates the human body vibration sound via the part of the user's body. For example, the controller 50 may apply an electrical signal corresponding to a sound signal of voice of the other party of a call to the piezoelectric element 30 so as to generate the air conduction sound and the human body vibration sound corresponding to the sound signal. The sound signal may be a ringtone, or music including songs. Also, the sound signal corresponding to the electrical signal may be based on music data stored in an internal storage of the electronic apparatus 1, or music data stored in an external server and the like to be reproduced via the network.

The panel 10 vibrates in an attaching region having the piezoelectric element 30 attached thereto, as well as in a region remote from the attaching region. The panel 10, in the regions to vibrate, includes a plurality of positions for vibrating in a direction intersecting with a main surface of the panel 10, each of which having a value of vibration amplitude changing with time from positive to negative or vice versa. The panel 10, at a certain moment, vibrates in such a manner that regions with relatively large vibration amplitude and regions with relatively small vibration amplitude are seemingly distributed in a random manner in the substantially entire panel 10. That is, over the entire panel 10, vibrations of a plurality of waves are detected. In order to prevent attenuation of the vibration of the panel 10 as described above when the user presses the panel 10 against the user's body applying the force of, for example, 5 N to 10 N, the voltage applied to the piezoelectric element 30 by the controller 50 may be ±15 V. Thereby, the user may hear the sound by bringing the region remote from the attaching region of the panel 10 described above into contact with the ear.

Figure 2:
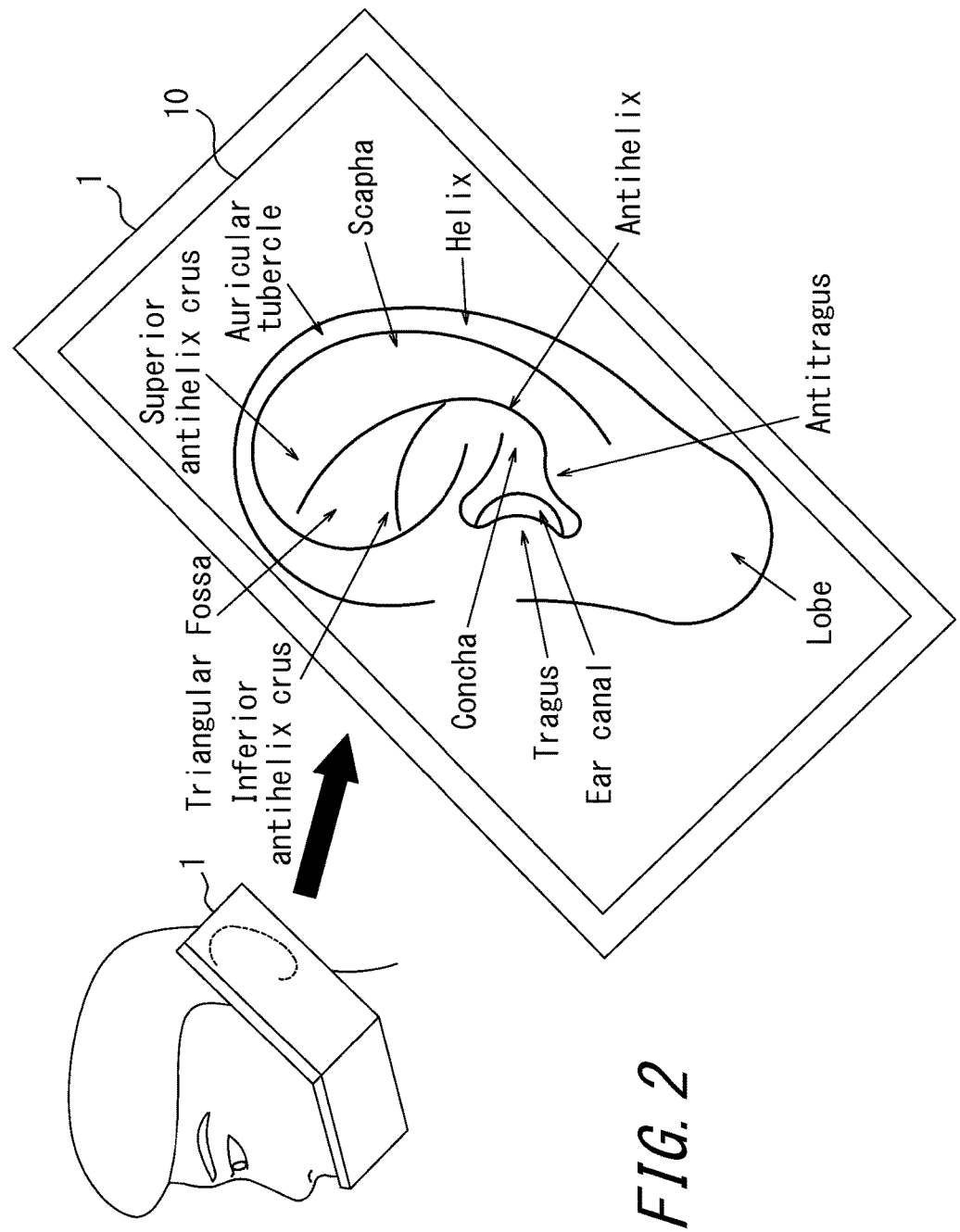
FIG. 2 is a diagram illustrating a preferred shape of a panel.

Here, the panel 10 may be in size approximately similar to a user's ear. Or, as illustrated in FIG. 2, the panel 10 may be larger than the user's ear. In this case, when the user listens to the sound, since the entire ear is likely to be covered by the panel 10 of the electronic apparatus 1, less ambient sounds (noises) may enter the ear canal. The panel 10 needs to vibrate in a region larger than a region having a length corresponding to a distance from the inferior antihelix crus (the lower antihelix crus) to the antitragus and a width corresponding to a distance from the tragus and the antihelix. Preferably, the panel 10 vibrates in a region having a length corresponding to a distance from an area in the vicinity of the superior antihelix crus (the upper antihelix crus) of the helix to the lobe and a width corresponding to a distance from the tragus to an area in the vicinity of the antihelix of the helix. The region having the length and the width as described above may be in a rectangular shape, or in an oval shape having the length described above as a long diameter and the width described above as a short diameter. For an average ear size of Japanese people, refer to Database of Japanese Body Size (1992-1994) provided by Research Institute of Human Engineering for Quality Life (HQL). When the panel 10 is equal to or larger than the average ear size of Japanese people, it is considered that the panel 10 may cover most of foreign nationals' entire ears.

The electronic apparatus 1 described above, by vibrating the panel 10, may deliver the air conduction sound and the human body vibration sound, which is delivered via a part of the user's body (for example, the cartilage of the outer ear), to the user. Therefore, when sound at a volume similar to that of a conventional dynamic receiver is output, less sound is transmitted around the electronic apparatus 1 through the vibration of the air caused by the vibration of the panel 10 as compared with that of the dynamic receiver. Accordingly, the electronic apparatus 1 is suitable for listening to, for example, a recorded message on a train or the like.

Since the electronic apparatus 1 described above delivers the human body vibration sound by vibrating the panel 10, when the user is wearing, for example, earphones or headphones, the user may hear the sound via the earphones or the headphones and a part of the user's body by bringing the electronic apparatus 1 into contact with the earphones or the headphones.

The electronic apparatus 1 described above delivers the sound to the user by vibrating the panel 10. Therefore, when the electronic apparatus 1 does not separately include the dynamic receiver, an opening (a sound opening) for voice transmission does not need to be formed on the housing, allowing simplification of a waterproof structure of the electronic apparatus 1. Note that, when the electronic apparatus 1 has the dynamic receiver, the sound opening is preferably sealed with a material that ventilates while blocking liquid. Such a material for ventilating while blocking liquid is, for example, Gore-Tex (registered trademark).

First Embodiment

Figure 3A:
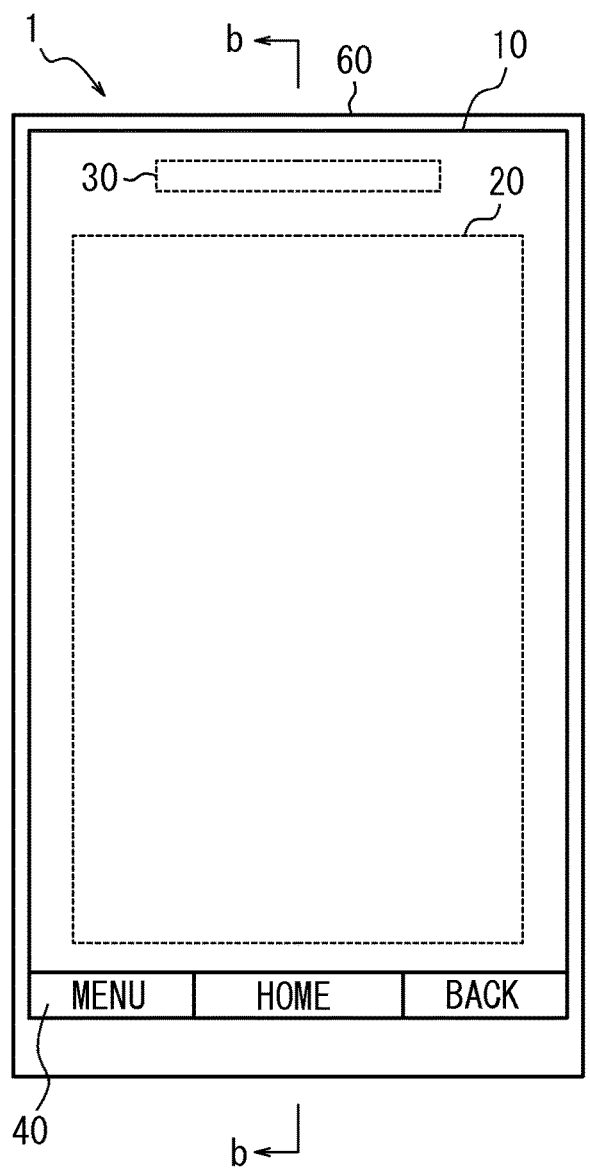
FIG. 3 are diagrams illustrating a housing structure of the electronic apparatus according to a first embodiment.
Figure 3B:
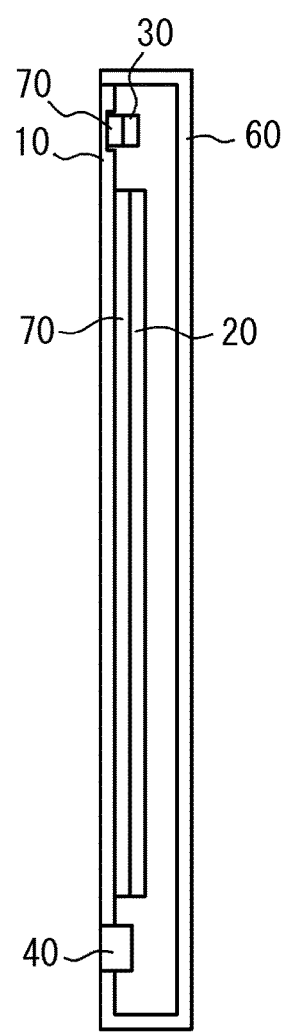
Figure 3C:
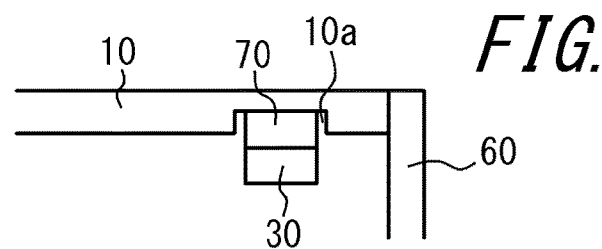

FIG. 3 are diagrams illustrating a housing structure of the electronic apparatus 1 according to a first embodiment. FIG. 3(a) is an elevation view, FIG. 3(b) is a cross-sectional view taken along the line b-b of FIG. 3(a), and FIG. 3(c) is a diagram illustrating an enlarged view of an upper portion of the electronic apparatus 1 of FIG. 3(b). Note that an orientation of the electronic apparatus 1 in FIG. 3(c) is different from that of the electronic apparatus 1 in FIG. 3(b).

The electronic apparatus 1 illustrated in FIG. 3 is a smartphone having the panel 10 that is a the ouch panel formed with a glass plate disposed on a front side of the housing 60 (for example, a metal or resin casing). The panel 10 and the input unit 40 are supported by the housing 60, and each of the display unit 20 and the piezoelectric element 30 is attached to the panel 10 by a joint member 70. The joint member 70 is a thermocurable adhesive, an ultraviolet curable adhesive, the double-sided adhesive tape or the like and may be made of an optical elasticity resin such as, for example, a colorless transparent acrylic ultraviolet-curable adhesive. Each of the panel 10, the display unit 20, and the piezoelectric element 30 has a substantially rectangular shape.

Referring to FIG. 3(c), an attachment structure of the piezoelectric element 30 to the panel 10 in the electronic apparatus 1 will be described. As shown in FIG. 3(c), the panel 10 has a recess 10a formed thereon. The panel 10 is disposed on the housing 60 in a state where the surface having the recess 10a is facing inside the electronic apparatus 1. A bottom surface of the recess 10a is substantially parallel to an outer surface of the panel 10. A lateral side of the recess 10a is substantially perpendicular to the outer surface. A depth of the recess 10a is approximately half the thickness of the panel 10. That is, a thickness of a region of the panel 10 having the recess 10a formed therein is approximately half a thickness of the other region. The recess 10a may be formed by scraping the surface of the panel 10 with a wheel cutter using, for example, diamond. Or, the recess 10a may be formed by, for example, picosecond pulsed laser processing. When the panel 10 is the touch panel, the recess 10a is formed where no electrode is disposed to detect the contact.

Then, the piezoelectric element 30 is disposed in the recess 10a formed on the panel 10. The piezoelectric element 30 is attached to the bottom surface of the recess 10a via the joint member 70 described above.

The display unit 20 is disposed at the substantial center of a short direction of the panel 10. The piezoelectric element 30 is disposed being spaced apart from an end of a longitudinal direction of the panel 10 by a predetermined distance in the vicinity of the end in such a manner that a longitudinal direction of the piezoelectric element 30 extends along the short direction of the panel 10. The display unit 20 and the piezoelectric element 30 are disposed side by side in a direction parallel to an internal surface of the panel 10.

Figure 4:
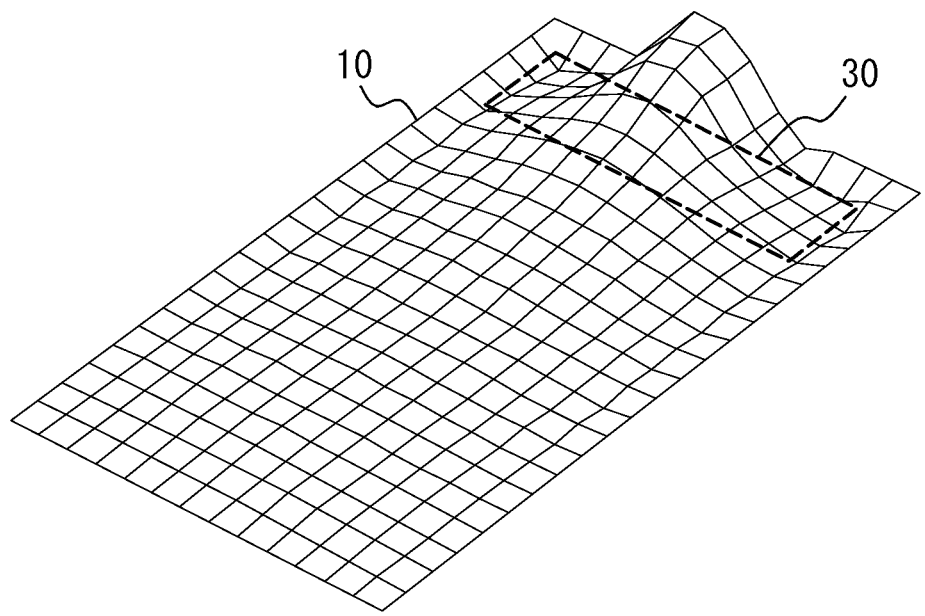
FIG. 4 is a diagram illustrating an example of a vibration of the panel of the electronic apparatus according to the first embodiment.

FIG. 4 is a diagram illustrating an example of the vibration of the panel 10 of the electronic apparatus 1 according to the first embodiment. In the electronic apparatus 1 according to the first embodiment, the display unit 20 is attached to the panel 10. Therefore, a lower portion of the panel 10 less vibrates than an upper portion of the panel 10 to which the piezoelectric element 30 is attached. Accordingly, the lower portion of the panel 10 may reduce sound leakage caused by the vibration thereof. The upper portion of the panel 10 is directly bent by the piezoelectric element 30, while the vibration is attenuated in the lower portion as compared with the upper portion. The panel 10 is bent by the piezoelectric element 30 in such a manner that a portion of the panel 10 directly above the piezoelectric element 30 is raised the highest in the longitudinal direction of the piezoelectric element 30 as compared with its surrounding.

According to the electronic apparatus 1 of the present embodiment, as described above, the panel 10 is deformed due to the deformation of the piezoelectric element 30 attached to the rear surface of the panel 10 and thereby delivers the air conduction sound and the human body vibration sound to an object in contact with the panel 10 being deformed. Therefore, without the necessity to protrude the vibrator on an outer surface of the housing 60, the air conduction sound and the human body vibration sound may be delivered to the user. Accordingly, the electronic apparatus 1 has better usability than an electronic apparatus described in PLT 1 that requires a vibrator, which is very small as compared with a housing, to be brought into contact with the human body. Also, since there is no need to bring the piezoelectric element 30 itself into contact with the user's ear, the piezoelectric element 30 is unlikely to be damaged. Further, when the housing 60 is deformed in place of the panel 10, the user is likely to drop a terminal upon generation of the vibration. However, the vibration of the panel 10 is less likely to cause such an accident.

Also, the piezoelectric element 30 is attached to the panel 10 via the joint member 70. Therefore, the piezoelectric element 30 may be attached to the panel 10 in such a manner that the degree of freedom of the deformation of the piezoelectric element 30 is unlikely to be inhibited. Also, the joint member 70 may be a non-thermocurable adhesive. This offers an advantage that, during curing, thermal stress shrinkage hardly occurs between the piezoelectric element 30 and the panel 10. Or, the joint member 70 may be the double-sided tape. This offers an advantage that shrinkage stress, which is caused in using the adhesive, is hardly applied between the piezoelectric element 30 and the panel 10.

The piezoelectric element 30 is disposed in the recess 10a formed on the panel 10. As described above, the region of the panel 10 having the recess 10a formed thereon is thinner than the other region. Since the piezoelectric element 30 is disposed in a relatively thin region of the panel 10, a degree of the region of the panel 10 having the recess 10a formed thereon to be directly bent by the deformation of the piezoelectric element 30 is greater than the other region. According to the electronic apparatus 1 of the present embodiment, accordingly, as compared with a case in which the recess 10a is not formed on the panel 10 and, also, the panel 10 is directly bent by the piezoelectric element 30 attached thereto, the bending deformation of the panel 10 is more efficiently delivered to the user when the user brings the region of the panel 10 having the piezoelectric element 30 attached thereto into contact with a part of the human body (for example, the ear).

Also, the region of the panel 10 having the recess 10a formed therein has lower rigidity than the other region. In other words, the region of the panel 10 without the piezoelectric element 30 has higher rigidity than the region having the piezoelectric element 30 attached thereto. Therefore, the lower portion of the panel 10 less vibrates than the upper portion of the panel 10 having the piezoelectric element 30 attached thereto. Accordingly, the lower portion of the panel 10 may reduce sound leakage due to the vibration thereof.

Further, since the piezoelectric element 30 is disposed in the recess 10a formed on the panel 10, as compared with a case in which the panel 10 does not have the recess 10a formed thereon, upon application of an external force to the electronic apparatus 1 when, for example, the electronic apparatus 1 is dropped and the like, electronic components arranged inside the electronic apparatus 1 are less likely to contact the piezoelectric element 30. That is, the piezoelectric element 30 is less likely to be damaged.

Exemplary Variations of First Embodiment

Figure 5A:
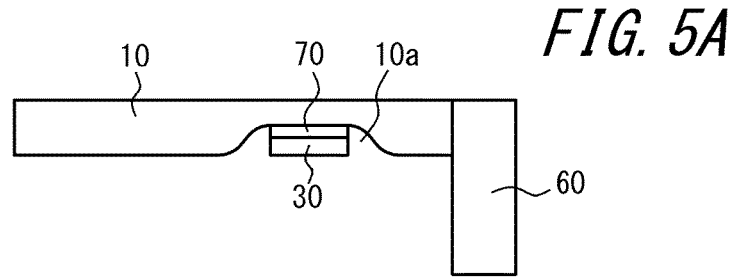
FIG. 5 are diagrams illustrating housing structures of the electronic apparatus according to exemplary variations of the first embodiment.
Figure 5B:
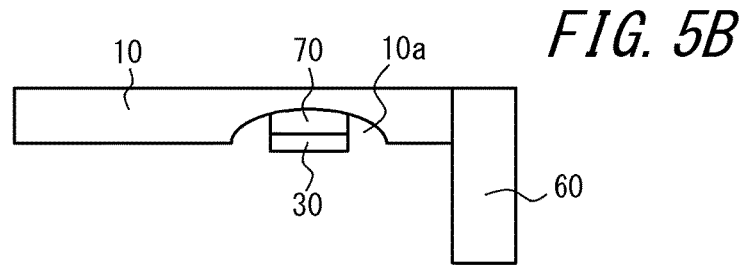
Figure 5C:
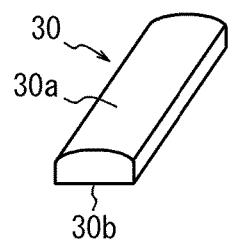
Figure 5D:
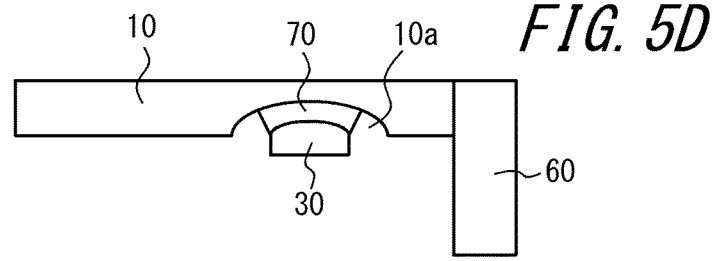
Figure 5E:
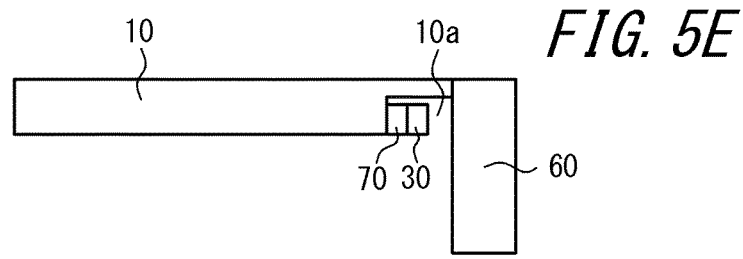

Next, referring to FIG. 5, exemplary variations of the first embodiment will be described. FIG. 5(a) is a diagram illustrating the housing structure according to a first variation example. FIG. 5(b) is a diagram illustrating the housing structure according to a second variation example. FIG. 5(c) is a diagram illustrating the piezoelectric element 30 according to a third variation example. FIG. 5(d) is a diagram illustrating the housing structure according to the third variation example. FIG. 5(e) is a diagram illustrating the housing structure according to a fourth variation example. FIG. 5(a), FIG. 5(b), FIG. 5(d), and FIG. 5(e) are diagrams viewed from a direction the same as that of FIG. 3(c). Hereinafter, structures the same as those of the first embodiment described above will be omitted, and aspects different from the first embodiment will be mainly described.

The first exemplary variation illustrated in FIG. 5(a) has the recess 10a in a shape different from that of the recess 10a in FIG. 3(c). That is, the recess 10a has a gently sloped edge. The recess 10a has an R-shaped edge. Since the edge of the recess 10a is gently sloped, as compared with the recess 10a with the vertical edge as illustrated in FIG. 3(c), the edge of the recess 10a is less likely to damage the piezoelectric element 30 when the piezoelectric element 30 is disposed in the recess 10a.

In FIG. 5(a), also, a main surface of the piezoelectric element 30 that is not attached to the panel 10 (a surface facing the inside of the electronic apparatus 1) is substantially flush with a main surface of the panel 10 located inside the electronic apparatus. That is, the piezoelectric element 30 disposed in the recess 10a does not protrude from the main surface of the panel 10 located inside the electronic apparatus toward the inside of the electronic apparatus 1. The main surface of the piezoelectric element 30 that is not attached to the panel 10 (the surface facing the inside of the electronic apparatus 1) may recede from the main surface of the panel 10 located inside the electronic apparatus 1. Thereby, upon application of the external force to the electronic apparatus 1 when, for example, the electronic apparatus 1 is dropped, the piezoelectric element 30 is less likely to be damaged.

According to the exemplary second variation illustrated in FIG. 5(b), the recess 10a has a curved cross-sectional shape. The curved shape may be, for example, a semicircular shape, a semi-elliptical shape, a parabolic shape, or the like. In FIG. 5 (b), also, the joint member 70 is an elastic adhesive. The elastic adhesive includes, for example, a silicone adhesive, a modified silicone-based adhesive, and a synthetic rubber-based adhesive. When the double-sided tape is used as the joint member 70 in order to attach the piezoelectric element 30 having a flat-plate shape to the recess 10a having the curved cross-sectional shape, due to different shapes of attachment surfaces, the piezoelectric element 30 and the recess 10a may not sufficiently attached together. Also, for example, when the piezoelectric element 30 and the recess 10a are attached together by an epoxy resin adhesive, although the piezoelectric element 30 and the recess 10a may be securely attached together, there is a possibility that, due to the curing of the adhesive, the deformation of the piezoelectric element 30 may not be sufficiently delivered to the panel 10. Since the elastic adhesive has higher elasticity after curing than an epoxy-based adhesive, the elastic adhesive may securely attach the piezoelectric element 30 and the recess 10a together and also deliver the deformation of the piezoelectric element 30 to the panel 10 after curing.

An exemplary third variation will be described with reference to FIG. 5(c) and FIG. 5(b). FIG. 5(c) is a perspective view of the piezoelectric element 30 according to the exemplary third variation. The piezoelectric element 30 includes a first main surface 30a and a second main surface 30b. The first main surface 30a has a central region protruding from peripheral region in a direction perpendicular to the second main surface 30b (in an upward direction in the figure). Note that the protrusion of the central region from the peripheral region does not need to be formed across the entire longitudinal direction (in a depth direction in the figure). Also, a protrusion amount of the central region of the first main surface 30a in the direction perpendicular to the second main surface 30b is set at, for example, approximately 7% to 30% of a thickness of the piezoelectric element 30. For example, when the piezoelectric element 30 has a shape of a rectangular parallelepiped with a length of 23.5 mm, a width of 3.3 mm, and a thickness of 0.5 mm excluding the protruding portion, the protrusion amount is approximately 0.05 mm. When the piezoelectric element 30 is designed to be in a substantially flat-plate shape with one of the main surfaces protruding as described above and, also, the recess 10a has the curved cross-sectional shape as illustrated in FIG. 5 (*d*), the similarity between the shapes of the attachment surfaces of the piezoelectric element 30 and the panel 10 allows sufficient attachment therebetween even when the double-sided tape is used as the joint member 70.

According to the exemplary fourth variation illustrated in FIG. 5(*e*), the piezoelectric element 30 is attached to a lateral side of the recess 10*a* via the joint member 70. The panel 10 is in the flat-plate shape having a main surface exposed to the outside of the electronic apparatus 1 and another main surface exposed to the inside of the electronic apparatus 1. The recess 10*a* illustrated in FIG. 5(*e*) is approximately orthogonal to the main surfaces. The piezoelectric element 30 is attached to the surface of the recess 10*a* approximately orthogonal to the main surfaces of the panel 10. This structure allows a reduction in a thickness of the electronic apparatus 1.

Second Embodiment

Figure 6A:
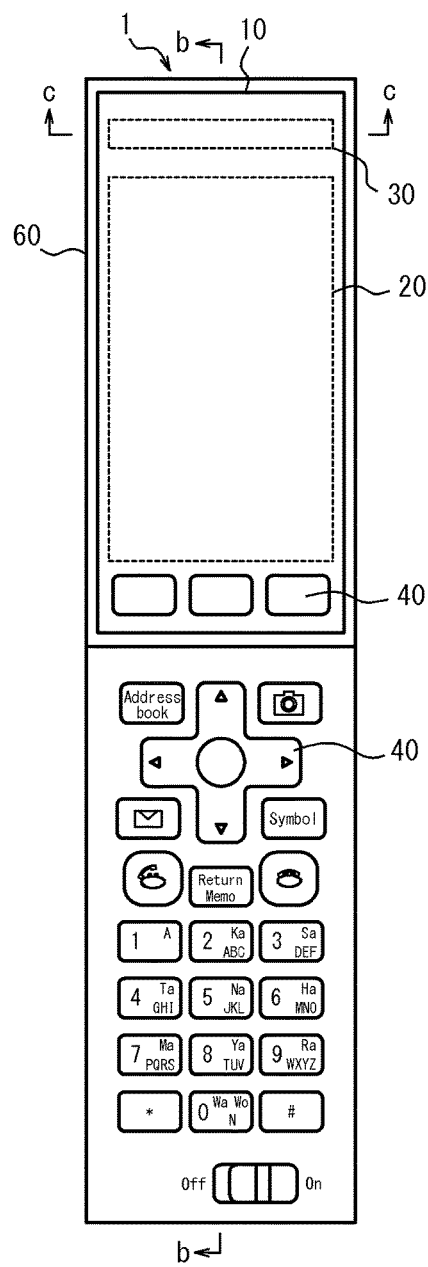
FIG. 6 are diagram illustrating a housing structure of an electronic apparatus according to a second embodiment.
Figure 6B:
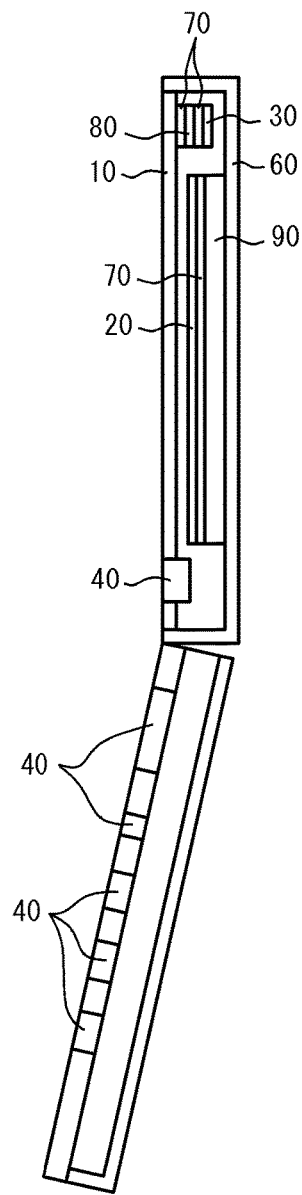
Figure 6C:
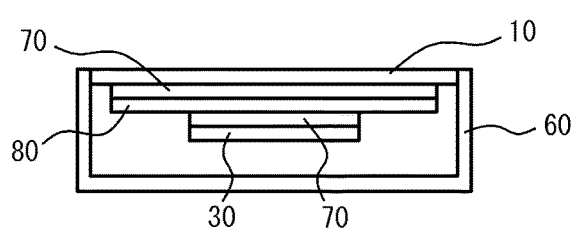

FIG. 6 are diagrams illustrating a housing structure of the electronic apparatus 1 according to a second embodiment. FIG. 6(*a*) is an elevation view, FIG. 6(*b*) is a cross-sectional view taken along the line b-b of FIG. 6(*a*), and FIG. 6(*c*) is a cross-sectional view taken along the line c-c of FIG. 6(*a*). The electronic apparatus 1 illustrated in FIG. 6 is a folding mobile phone terminal having the cover panel (an acrylic plate) serving as the panel 10 for protecting the display unit 20 disposed on a front side of an upper portion of the housing 60. According to the second embodiment, a reinforcing member 80 is disposed between the panel 10 and the piezoelectric element 30. The reinforcing member 80 is, for example, a resin plate, or a resin plate containing a sheet metal or glass fiber. That is, the electronic apparatus 1 according to the second embodiment has a structure in which the piezoelectric element 30 and the reinforcing member 80 are attached together by the joint member 70 and, further, the reinforcing member 80 and the panel 10 are attached together by the joint member 70. According to the second embodiment, also, the display unit 20 is not attached to the panel 10 but is supported by the housing 60. That is, in the electronic apparatus 1 according to the second embodiment, the display unit 20 is separated from the panel 10, and the display unit 20 and a support portion 90 that is forming a part of the housing 60 are attached together by the joint member 70. Note that the support portion 90 is not limited to a part of the housing 60 but may be a member made of metal or resin and independent from the housing 60.

In the second embodiment, similarly to the first embodiment, the piezoelectric element 30 and the reinforcing member 80 are disposed in the recess 10*a* formed on the panel 10. Also, the structures of the exemplary variations illustrated in FIG. 5 may be appropriately employed.

Figure 7:
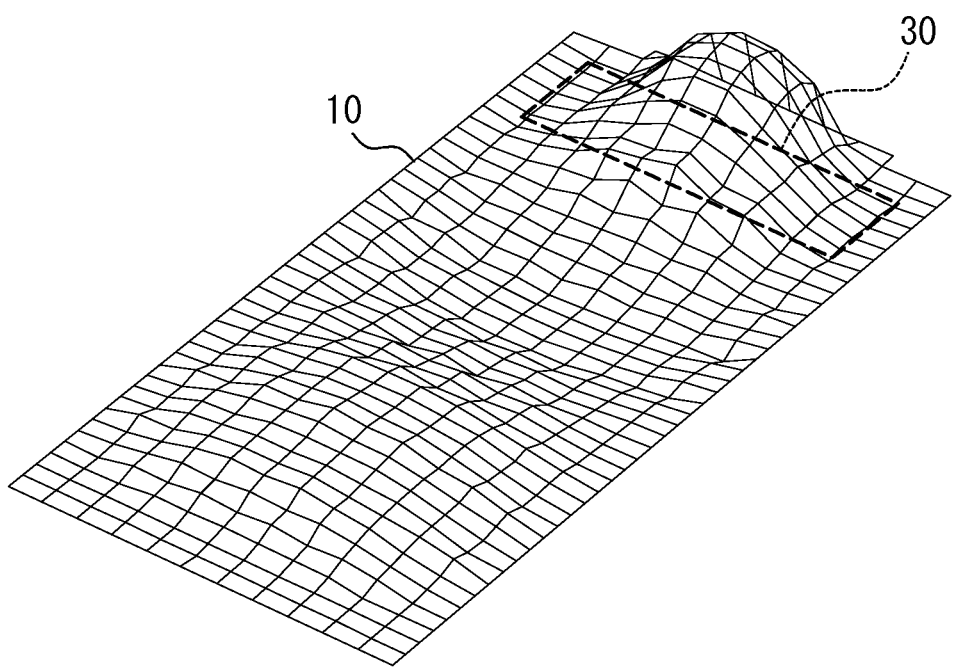
FIG. 7 is a diagram illustrating an example of a vibration of a panel of the electronic apparatus according to the second embodiment.

FIG. 7 is a diagram illustrating an example of the vibration of the panel 10 of the electronic apparatus 1 according to the second embodiment. In the electronic apparatus 1 according to the second embodiment, since the panel 10 is the acrylic plate having lower rigidity than the glass plate and, also, the display unit 20 is not attached to the rear surface of the panel 10, the vibration amplitude of the piezoelectric element 30 is greater than that of the electronic apparatus 1 according to the first embodiment illustrated in FIG. 4. Also, the panel 10 vibrates in the attaching region having the piezoelectric element 30 attached thereto, as well as in the region remote from the attaching region. Accordingly, the user may hear the air conduction sound via the air and also the human body vibration sound by bringing any region of the panel 10 into contact with the ear.

According to the electronic apparatus 1 of the present embodiment, as described above, due to the deformation of the piezoelectric element 30 attached to the panel 10 via the reinforcing member 80, the reinforcing member 80 and the panel 10 are deformed, whereby the air conduction sound and the human body vibration sound are delivered to an object in contact with the panel 10 being deformed. Accordingly, without the necessity to bring the vibrator itself into contact with the ear, the air conduction sound and the human body vibration sound may be delivered to the user. Also, the piezoelectric element 30 is attached to the internal surface of the panel 10 inside the housing 60. Accordingly, without the necessity to protrude the vibrator on the outer surface of the housing 60, the air conduction sound and the human body vibration sound may be delivered to the user. Further, the panel 10 is deformed delivering the air conduction sound and the human body vibration sound in the region having the piezoelectric element 30 attached thereto, as well as in any region thereof. Accordingly, the user may hear the air conduction sound via the air and also the human body vibration sound by bringing any region of the panel 10 into contact with the ear.

Further, since the reinforcing member 80 is disposed between the piezoelectric element 30 and the panel 10, the possibility that an external force applied to the panel 10 is transmitted to and damaging the piezoelectric element 30 may be reduced. Also, when the panel 10 is brought into hard-contact with the panel 10, the vibration of the panel 10 is less attenuated. Further, since the reinforcing member 80 is disposed between the piezoelectric element 30 and the panel 10, a resonance frequency of the panel 10 is lowered and acoustic characteristics in a low frequency band are improved. Note that, in place of the reinforcing member 80, a plate-shaped weight may be attached to the piezoelectric element 30 by the joint member 70.

Although the present disclosure has been described based on the figures and the embodiments, it is to be understood that various changes and modifications may be implemented based on the present disclosure by those who are ordinarily skilled in the art. Accordingly, such changes and modifications are included in the scope of the present invention. For example, functions and the like included in each unit, each step and the like may be rearranged without logical inconsistency, so as to combine a plurality of components or steps together or to divide them.

As illustrated in FIG. 8, for example, the panel 10 may be attached to the housing 60 by the joint member 70. Thereby, the vibration from the panel 10 is hardly directly delivered to the housing 60 and therefore, as compared with a structure in which the housing 60 itself greatly vibrates, a risk that the user drops the electronic apparatus 1 may be reduced. Also, the joint member 70 may be the non-thermocurable adhesive, which offers an advantage that, during curing, the thermal stress shrinkage is hardly generated between the housing 60 and the panel 10. Or, the joint member 70 may be the double-sided adhesive tape, which offers an advantage that shrinkage stress, which occurs in using the adhesive, is hardly applied between the housing 60 and the panel 10.

For example, when the electronic apparatus 1 has a structure in which the panel 10 and the display unit 20 do not overlap with each other, the piezoelectric element 30 may be disposed in the center of the panel 10. When the piezoelectric element 30 is disposed in the center of the panel 10, the vibration of the piezoelectric element 30 is delivered uniformly to the entire panel 10, whereby quality of the air conduction sound may be improved, and the user may recognize the human body vibration sound by bringing various regions of the panel 10 into contact with the ear. Similarly to the above embodiments, a plurality of piezoelectric elements 30 may be attached.

Also, although the electronic apparatus 1 described above has a structure in which the piezoelectric element 30 is attached to the panel 10, the piezoelectric element 30 may be attached elsewhere. For example, the piezoelectric element 30 may be attached to a battery lid that is attached to the housing 60 for covering a battery. In the electronic apparatus 1 such as the mobile phone terminal and the like, since the battery lid is often attached to a plane different from a plane having the panel 10, the above structure allows the user to hear the sound by bringing a surface other than the panel 10 into contact with a part of the user's body (for example, the ear).

Further, the panel 10 may partially or entirely constitute any one of a display panel, an operation panel, the cover panel, and a lid panel for allowing removal of the battery. Especially when the panel 10 constitutes the display panel, the piezoelectric element 30 is disposed outside a display area for executing a display function. This offers an advantage that a display is hardly inhibited. The operation panel includes the touch panel of the first embodiment. Or, the operation panel includes a sheet key, which is a member having key tops of operation keys of, for example, the folding mobile phone integrally formed thereon and forming one plane of the housing having an operation unit.

Also, the recess 10*a* may be formed on a surface of the panel 10 on an external side of the electronic apparatus 1, and the piezoelectric element 30 may be disposed in the recess 10*a*. Moreover, the member (the attachment member) to which the piezoelectric element 30 is attached is not limited to the panel 10 but may be, for example, the housing 60. The attachment member is, for example, an acrylic panel constituting an exterior of the electronic apparatus 1 for exposing a light-receiving surface of a camera module or an infrared module. The attachment member may be a connector cap for covering a connector such as, for example, a micro USB or like.

Note that, although in the first embodiment and the second embodiment both the joint member for attaching the panel 10 and the piezoelectric element 30 together and the joint member for attaching the panel 10 and the housing 60 together are commonly denoted by a reference sign "70", different joint members may be appropriately used according to the members to attach in the first embodiment and the second embodiment.

REFERENCE SIGNS LIST

1 electronic apparatus
10 panel
10*a* recess
20 display unit
30 piezoelectric element
40 input unit
50 controller
60 housing
70 joint member
80 reinforcing member
90 support portion

The invention claimed is:

1. An electronic apparatus having a piezoelectric element and a member having the piezoelectric element attached thereto, the electronic apparatus for causing the piezoelectric element to deform the member in such a manner vibrating a part of a human body in contact with the member being deformed, and thereby delivering sound, wherein
the member has a recess formed thereon,
the piezoelectric element is attached to the recess of the member,
the recess is located apart from a side edge of the member when viewed in a side cross-sectional view through a longitudinal direction of the electronic apparatus,
the recess faces an interior space within the electronic apparatus, and
the piezoelectric element has a first main surface, the first main surface having a central region protruding from a peripheral region.

2. The electronic apparatus according to claim 1, wherein the member vibrates in a region larger than a region having a length corresponding to a distance from the inferior antihelix crus of the ear to the antitragus and a width corresponding to a distance from the tragus to the antihelix.

3. The electronic apparatus according to claim 1, wherein the member is bent by the piezoelectric element in such a manner that a region of the member directly above the piezoelectric element is raised the highest in a longitudinal direction of the piezoelectric element as compared with a surrounding region of the member, and a part of the human body in contact with the member vibrates and delivers sound.

4. The electronic apparatus according to claim 1, wherein the member is a panel.

5. The electronic apparatus according to claim 4, wherein the panel partially or entirely constitutes any one of a display panel, an operation panel, a cover panel, and a lid panel for allowing removal of a battery.

6. The electronic apparatus according to claim 5, wherein, when the panel constitutes the display panel, the recess is formed outside a display area for executing a display function.

7. The electronic apparatus according to claim 1, wherein the first main surface faces the recess.

8. The electronic apparatus according to claim 1, wherein at least a portion of the recess has a curved cross-sectional shape.

9. The electronic apparatus according to claim 1, wherein at least a portion of the recess has a gently sloped edge.

10. The electronic apparatus according to claim 1, wherein the piezoelectric element is free from direct contact with the recess.

11. The electronic apparatus according to claim 1, wherein all sides of the piezoelectric element are free from contact with the recess.

12. The electronic apparatus according to claim 1, wherein the piezoelectric element protrudes from a surface of the member located inside the electronic apparatus.

13. An electronic apparatus having a piezoelectric element and a member having the piezoelectric element attached thereto, the electronic apparatus for causing the piezoelectric element to deform the member in such a manner vibrating a part of a human body in contact with the member being deformed, and thereby delivering sound, wherein
the member has a recess formed thereon,
the piezoelectric element is attached to the recess of the member,
at least a portion of the recess has a curved cross-sectional shape,
the recess faces an interior space within the electronic apparatus, and the piezoelectric element has a first main surface, the first main surface having a central region protruding from a peripheral region.

14. An electronic apparatus having a piezoelectric element and a member having the piezoelectric element attached thereto, the electronic apparatus for causing the piezoelectric element to deform the member in such a manner vibrating a part of a human body in contact with the member being deformed, and thereby delivering sound, wherein the member has a recess formed thereon,
- the piezoelectric element is attached to the recess of the member,
- the piezoelectric element is free from direct contact with the recess,
- the recess faces an interior space within the electronic apparatus, and
- the piezoelectric element has a first main surface, the first main surface having a central region protruding from a peripheral region.

* * * * *